(12) United States Patent
Li et al.

(10) Patent No.: US 9,156,236 B2
(45) Date of Patent: Oct. 13, 2015

(54) VACUUM-POWERED FILM-APPLYING MECHANISM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzhen (CN); Bo Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 119 days.

(21) Appl. No.: 13/959,741

(22) Filed: Aug. 6, 2013

(65) Prior Publication Data

US 2014/0083621 A1    Mar. 27, 2014

(30) Foreign Application Priority Data

Sep. 24, 2012 (CN) .......................... 2012 1 0357306

(51) Int. Cl.

| B29C 65/80 | (2006.01) |
|---|---|
| B32B 37/10 | (2006.01) |
| B32B 38/18 | (2006.01) |
| B65C 9/14 | (2006.01) |
| B65C 9/30 | (2006.01) |

(Continued)

(52) U.S. Cl.
CPC ......... *B32B 37/0046* (2013.01); *B29C 63/0004* (2013.01); *B29C 63/024* (2013.01); *Y10T 156/17* (2015.01)

(58) Field of Classification Search
CPC B32B 37/0046; B32B 37/10; B32B 37/1009; B32B 37/1018; B29C 63/0004; B29C 63/024; B29C 65/48; Y10T 156/17; B65C 9/08; B65C 9/18; B65C 9/1815; B65C 9/1819; B65C 9/26
USPC .................................. 156/538, 543, 549, 567
See application file for complete search history.

(56) References Cited

U.S. PATENT DOCUMENTS 3,981,499 A * 9/1976 Watson ......................... 271/276
4,061,527 A * 12/1977 Traise ............................ 156/519

(Continued)

FOREIGN PATENT DOCUMENTS

| CN | 1190373 A | 8/1998 |
|---|---|---|
| CN | 102664283 A | 9/2012 |

*Primary Examiner* — Sing P Chan
(74) *Attorney, Agent, or Firm* — Novak Druce Connolly Bove + Quigg LLP

(57) ABSTRACT

A vacuum-powered film-applying mechanism for applying a flexible film to a workpiece includes a bracket, a suction member, and a rotating joint. The suction member is rotatably mounted on the bracket, and defines a peripheral surface and a plurality of suction chambers therein, and by virtue of a vacuum created in the interior of the suction member, a length of flexible film is attracted and adhered. The rotating joint on the bracket communicates with the plurality of the suction chamber, through the rotating joint, air is supplied and exhausted from the plurality of suction chambers progressively, on a one by one basis, to pick up and roll the flexible film onto itself, and by supplying air to the plurality of suction chambers one by one, unrolls and releases the flexible film onto the workpiece with a low incidence of trapping air bubbles.

19 Claims, 4 Drawing Sheets

(51) Int. Cl.
*B32B 37/00* (2006.01)
*B29C 63/00* (2006.01)
*B29C 63/02* (2006.01)

(56) References Cited

U.S. PATENT DOCUMENTS

| | | | |
|---|---|---|---|
| 4,589,945 A * | 5/1986 | Polit | 156/497 |
| 4,671,843 A * | 6/1987 | Olsen | 156/450 |
| 5,061,334 A * | 10/1991 | Paules | 156/235 |
| 5,344,519 A * | 9/1994 | Galchefski et al. | 156/456 |
| 5,749,990 A * | 5/1998 | Rello et al. | 156/187 |
| 5,766,406 A * | 6/1998 | Bohn et al. | 156/362 |
| 6,026,725 A * | 2/2000 | Okonski | 83/698.21 |
| 6,149,755 A * | 11/2000 | McNichols et al. | 156/264 |
| 6,471,802 B1 * | 10/2002 | Williamson | 156/64 |
| 8,097,110 B2 * | 1/2012 | Schiebout | 156/265 |
| 2004/0232609 A1 * | 11/2004 | Stefanoni | 270/5.02 |
| 2007/0114109 A1 * | 5/2007 | Berndtsson et al. | 198/471.1 |

* cited by examiner

VACUUM-POWERED FILM-APPLYING MECHANISM

BACKGROUND

1. Technical Field

The present disclosure relates to a mechanism which apply labels or other materials to products, and more particularly, to a mechanism for sticking or adhering a film made of flexible materials to a workpiece.

2. Description of Related Art

In industry, a mechanism is employed to pick up a film made of flexible materials in strip shape, such as an adhesive tape, and to paste or adhere the flexible film to a workpiece. The mechanism includes a moving assembly and a pick-up member connected to the moving assembly. The pick-up member is in a plate shape with a negative pressure therein. When picking up the flexible film, the moving assembly moves the pick-up member to the flexible film, the pick-up member presses against the flexible film and picks it up. Then the moving assembly moves the pick-up member to the workpiece, the pick-up member releases the flexible film onto the workpiece and pastes or adheres the flexible film onto the workpiece entirely. However, air bubbles are often generated between the flexible film and the workpiece.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
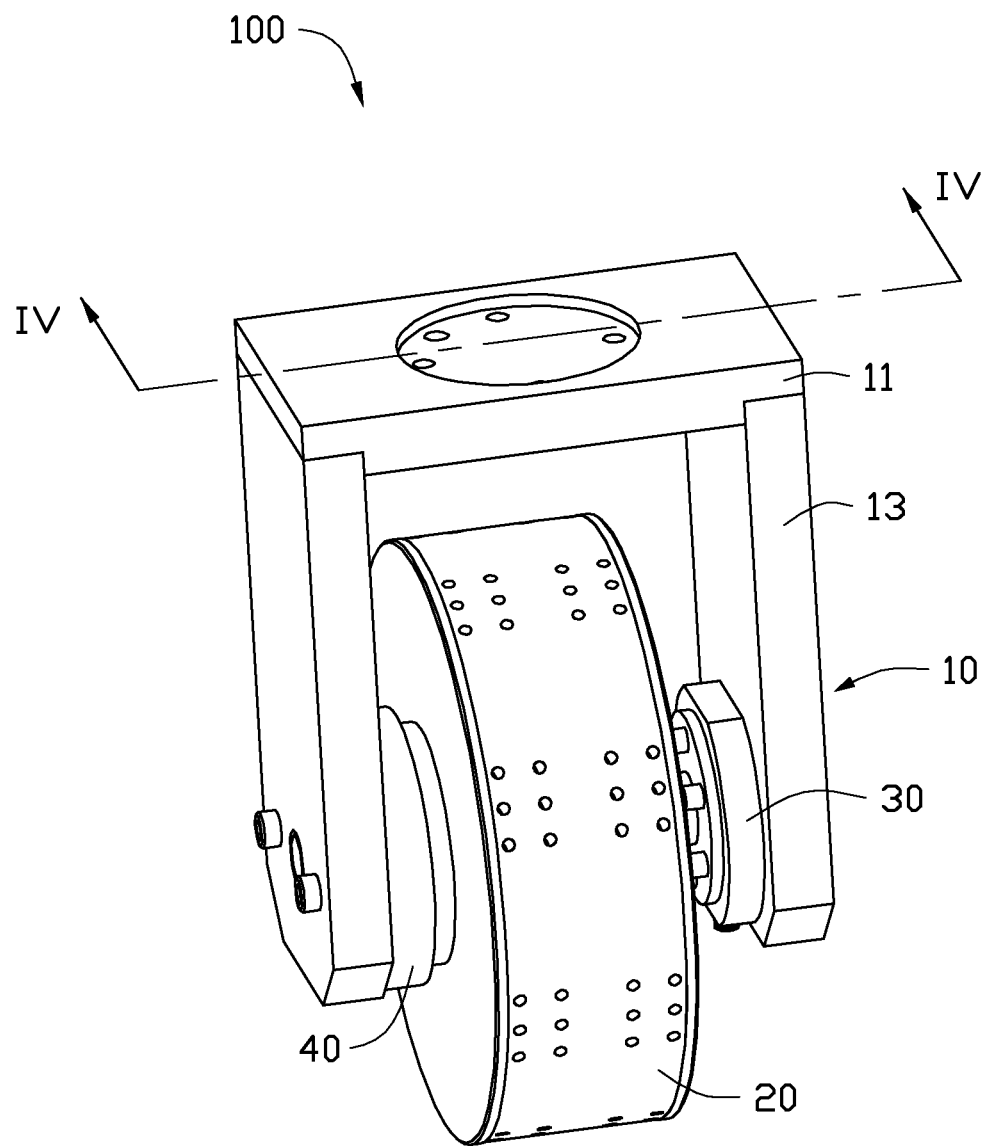
FIG. 1 is an isometric view of an embodiment of a film-applying mechanism.

Referring to FIG. 1, an embodiment of a vacuum-powered film-applying mechanism 100 includes a bracket 10, a suction member 20, a rotating joint 30, and an adjusting assembly 40. The suction member 20 is rotatably mounted on the bracket 10. The rotating joint 30 is rotatably mounted on the bracket 10 adjacent to the suction member 20. The rotating joint 30 is connected to the suction member 20 for supplying and extracting air from the suction member 20. The adjusting assembly 40 is mounted on the bracket 10 and resists the suction member 20 to provide a rotational resistance force against the suction member 20.

Figure 2:
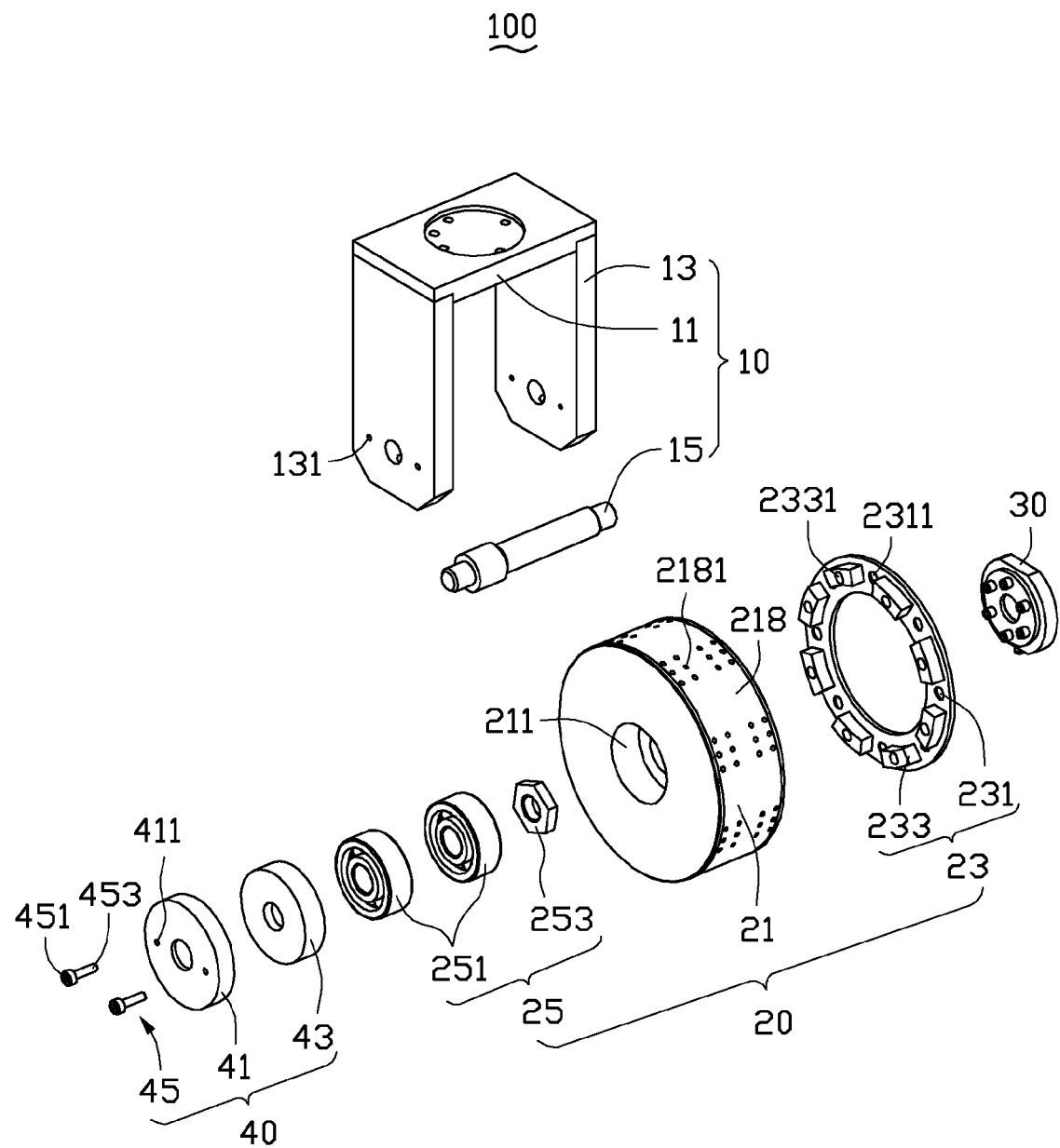
FIG. 2 is an exploded, isometric view of the film-applying mechanism of FIG. 1.
Figure 3:
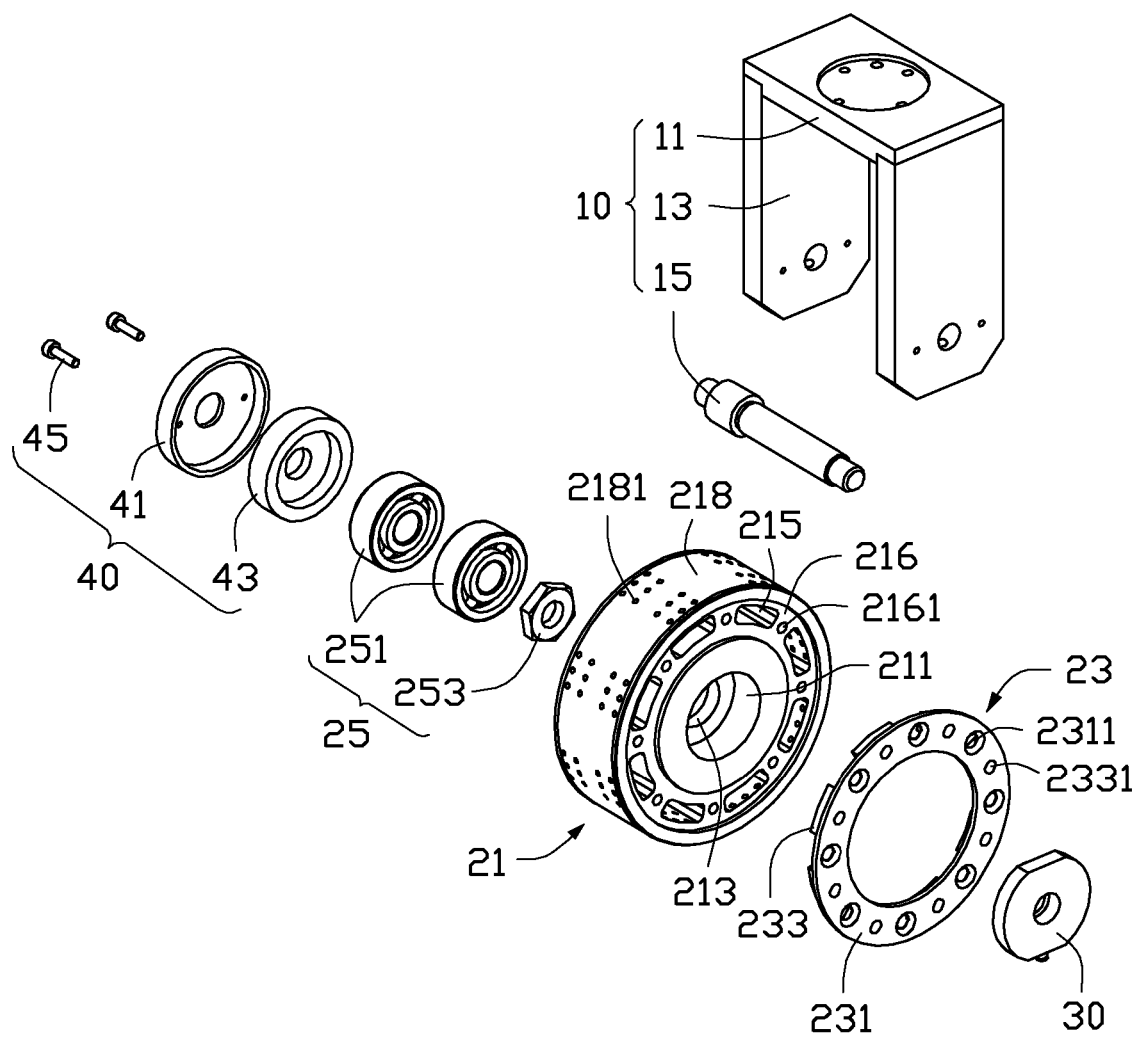
FIG. 3 is similar to FIG. 2, but viewed from another aspect.

Also referring to FIGS. 2 and 3, the bracket 10 includes a mounting plate 11, a pair of supporting plates 13, and a rotating shaft 15. The mounting plate 11 is mounted on a robot arm (not shown). The pair of supporting plates 13 extends from opposite ends of the mounting plate 11 perpendicularly. The mounting plate 11 and the pair of supporting plates 13 cooperatively form a "U" shape. The rotating shaft 15 is rotatably mounted on the pair of supporting plates 13, and spaced from the mounting plate 11. Opposite ends of the rotating shaft 15 are secured by the pair of supporting plates 13. Each supporting plate 13 defines a pair of screw holes 131 adjacent to opposite sides of the rotating shaft 15.

Figure 4:
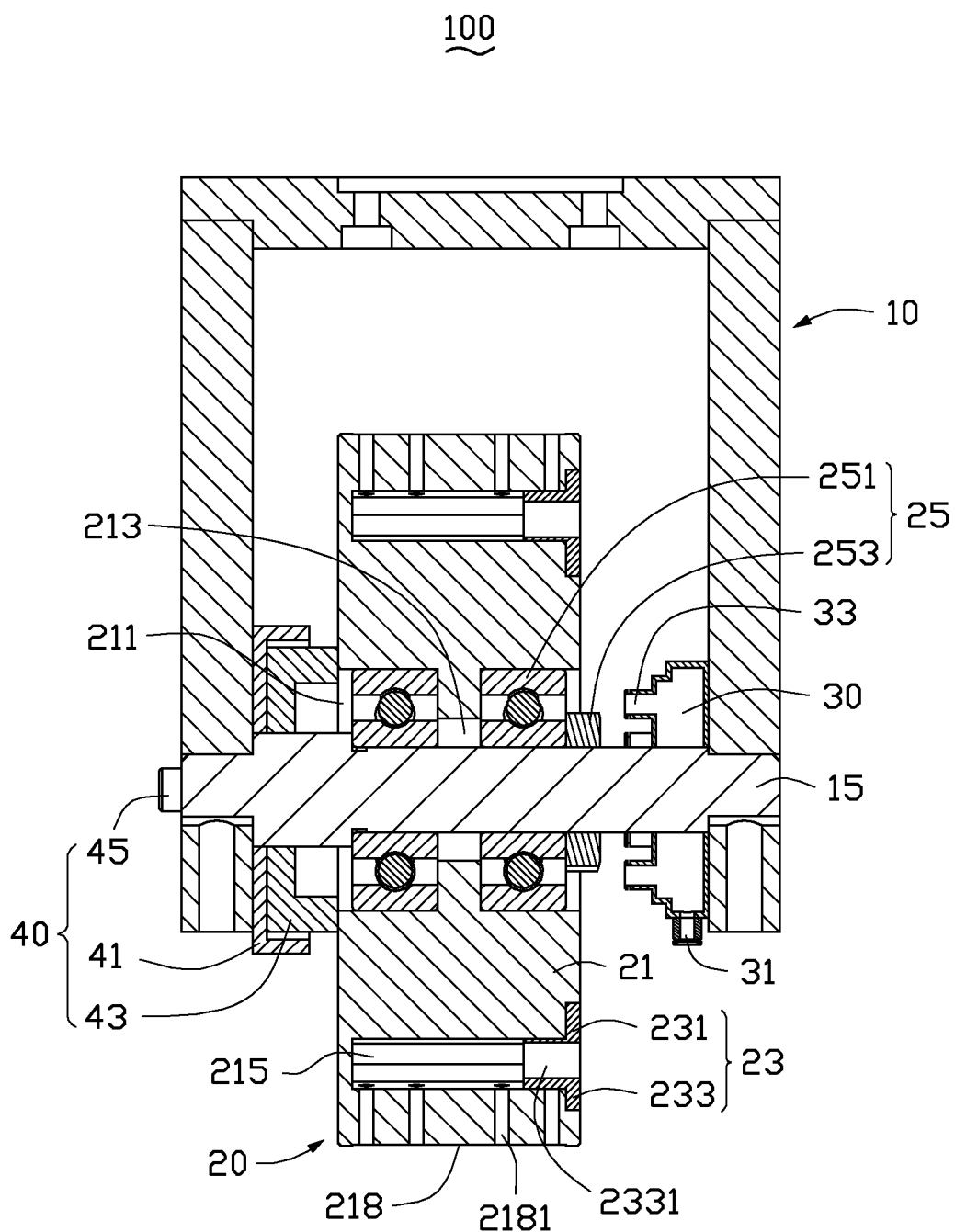
FIG. 4 is a cross-sectional view of the film-applying mechanism of FIG. 1, taken along line IV-IV of FIG. 1.

Also referring to FIG. 4, the suction member 20 is cylindrical, and includes a main body 21, a shielding cover 23 mounted on an end of the main body 21, and a mounting subassembly 25. The main body 21 is annular, and defines a pair of receiving holes 211 at opposite ends thereof and a sleeving hole 213 interconnecting the pair of receiving holes 211. The sleeving hole 213 is located between the pair of receiving holes 211 and communicates with the pair of receiving holes 211 at opposite ends thereof. The sleeving hole 213 has a diameter smaller than that of each of the receiving holes 211. The main body 21 is rotatably sleeved on the rotating shaft 15 through the sleeving hole 213. The main body 21 defines a peripheral suction surface 218 along an outer periphery thereof, and a plurality of suction chambers 215 surrounding a center of the main body 21, and the main body 21 also includes a plurality of separating portions 216. The peripheral suction surface 218 defines a plurality of suction holes 2181 divided into several groups. Each group of suction holes 2181 communicates with one of the suction chambers 215 and is open to the outside air. The plurality of suction chambers 215 are defined at an end of the main body 21 and uniformly arranged adjacent to a periphery of the main body 21 in a looped configuration. Each separating portion 216 is formed between two adjacent suction chambers 215 to separate the two adjacent suction chambers 215. Each separating portion 216 defines a fixing hole 2161 therein along an axial direction of the main body 21.

The shielding cover 23 is assembled to the end of the main body 21 of which the plurality of suction chambers 215 is defined, thereby sealing the plurality of suction chambers 215. The shielding cover 23 includes an annular base body 231 and a plurality of sealing portions 233 formed on the base body 231. The plurality of sealing portions 233 are uniformly arranged adjacent to a periphery of the base body 231 in a looped configuration for sealing each of the plurality of suction chambers 215. Each sealing portion 233 defines a though hole 2331 cutting through the base body 231, the through holes 2331 communicate with the suction chamber 215 for supplying and exhausting air from the suction chamber 215. The base body 231 defines a plurality of mounting holes 2311 thereon, and each mounting hole 2311 is located between two adjacent sealing portions 233. The base body 231 is mounted on the main body 21 via the plurality of mounting holes 2311 and the plurality of fixing holes 2161.

The mounting subassembly 25 includes a pair of bearings 251 and a fixing member 253. The pair of bearings 251 is rotatably sleeved on the rotating shaft 15, and received in the pair of receiving holes 211. The pair of bearings 251 rotatably interconnects the main body 21 and the rotating shaft 15. The fixing member 253 is sleeved on the rotating shaft 15 adjacent to the end of the main body 21 where the shielding cover 23 is located. The fixing member 253 resists one of the bearings 251 toward the sleeving hole 213 to hold the suction member 20.

The rotating joint 30 is rotatably sleeved on the rotating shaft 15 adjacent to the shielding cover 23. The rotating joint 30 defines a first air conduit 31 and a plurality of second air conduits 33. The first air conduit 31 is connected to pressured vacuum source (such as vacuum pump, not shown), and the plurality of second air conduits 33 communicates with the first air conduit 31. The plurality of second air conduits 33 further communicate with the plurality of though holes 2331 of the shielding cover 23 via pipes or tubes (not shown). When a diameter of the rotating joint 30 is equal to that of the shielding cover 23, and the plurality of second air conduits 33 connects directly with the plurality of though holes 2331, the pipes or tubes may be omitted.

The adjusting assembly 40 is mounted on an end of the main body 21 opposite to or away from the shielding cover 23. The adjusting assembly 40 includes a first friction member 41, a second friction member 43, and a pair of resisting members 45. The first friction member 41 and the second friction member 43 are located between the main body 21 and one supporting plate 13. The first friction member 41 and the second friction member 43 are bowl-shaped, and each thereof defines an opening (not labeled) toward the main body 21. The first friction member 41 defines a pair of resisting holes 411 thereon communicating with the opening thereof. The second friction member 43 has a diameter smaller than that of the first friction member 41, and is partially received in the first friction member 41. The second friction member 43 is made of rubber, and resists the main body 21 toward the fixing member 253. Each resisting member 45 engages with one screw hole 131, extends through one resisting hole 411, and then resists against the second friction member 43. The resisting member 45 includes a head portion 451 and a resisting portion 453 coaxial to the head portion 451. The head portion 451 protrudes out from the supporting plate 13, and the resisting portion 453 resists the second friction member 43 toward the main body 21.

When assembling, the shielding cover 23 is assembled to the main body 21 to seal the plurality of suction chambers 215 by means of the plurality of sealing portions 233. The suction member 20 is rotatably sleeved on the rotating shaft 15 via the mounting subassembly 25. The adjusting assembly 40 and the rotating joint 30 are assembled to opposite ends of the suction member 20. The rotating shaft 15 is assembled to the pair of supporting plates 13, and the mounting plate 11 is assembled to the robot arm.

When in use, the suction member 20 attracts an end of a flexible film (not shown), the flexible film will adhere tightly to the peripheral suction surface 218. The suction member 20 rotates to travel along the flexible film, and simultaneously, negative air pressure is generated progressively in the suction chambers 215 on a one by one basis via the rotating joint 30, so that the suction member 20 thus rolls up the flexible film and carries the length of the flexible film adhering to the peripheral suction surface 218. The flexible film is finally wound around the suction member 20. The vacuum powered film-applying mechanism 100 is moved to a workpiece (not shown), and the suction member 20 places and presses the flexible film on the workspace, and rolls along the workpiece. Positive air pressure is generated in the suction chambers 215, thereby releasing and pressing the flexible film onto the workpiece, and the flexible film thus adheres to the workpiece. Rotating the pair of resisting member 45 to resist the first friction member 41, and the friction member 41 may move toward the main body 21, thereby adjusting the resist force on the suction member 20.

In the film-applying process, the suction member 20 unrolls and adheres the flexible film onto the workpiece by rotating and pressing the flexible film on the workpiece, and the plurality of suction chambers 215 releases one by one each of their suction on the flexible film, therefore, the likelihood of air bubbles trapped between the flexible film and the suction member 20 is reduced, and a quality of the film-applying process is enhanced. When rotating the pair or resisting member 45 to resists the first friction member 41, a rotating resistance force of the suction member 20 is thereby adjusted; therefore it is adapted to fully stretch the flexible film to be as far as it can be stretched.

The plurality of suction chambers 215 may be substituted by an integrally annular chamber. The groups of suction holes 2181 communicate with the integrally annular chamber. The groups of suction holes 2181 may be uniformly distributed along the peripheral suction surface 218 of the suction member 20.

The first friction member 41 may be made of rubber without having any resisting holes 411, and the resisting member 45 may then be directly resisting the first friction member 41. The resisting holes 411 may be screw holes, and the resist member 45 may engage with the resisting holes 411.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A vacuum-powered film-applying mechanism for adhering a flexible film to a workpiece, comprising:
    a bracket comprising a rotating shaft;
    a suction member rotatably sleeved on the rotating shaft, and defining a peripheral suction surface along a periphery thereof and a plurality of suction chambers therein, the peripheral suction surface defining a plurality of suction holes respectively communicating with the plurality of suction chambers; and
    a rotating joint rotatably sleeved on the rotating shaft and defining a plurality of air conduits respectively communicating with the plurality of the suction chambers, wherein when the suction member is rotated to suck the flexible film, the rotating joint is capable of exhausting air from the plurality of suction chambers one by one to enable the suction member to be sticking to and rolling the flexible film thereon, when the suction member is rotated to adhere the flexible film to the workpiece, the rotating joint is capable of supplying air to the plurality of suction chambers one by one to enable the suction member to unroll and release the flexible film.

2. The film-applying mechanism of claim 1, wherein the plurality of suction holes are divided into a plurality of groups respectively communicating with the plurality of suction chamber.

3. The film-applying mechanism of claim 1, wherein the suction member is in a cylindrical shape, and the plurality of suction holes are uniformly distributed along the peripheral suction surface of the suction member.

4. The film-applying mechanism of claim 1, wherein the suction member comprise a main body configured in an annular shape, and a shielding cover mounted on an end of the main body, the plurality of suction chambers are defined on an end of the main body and uniformly arranged adjacent to a periphery of the main body in a looped configuration, the shielding cover seals the plurality of suction chambers.

5. The film-applying mechanism of claim 4, wherein the shielding cover comprises a base body configured in an annular shape and a plurality of sealing portions formed on the base body, the plurality of sealing portions are uniformly arranged adjacent to a periphery of the base body in a looped configuration for respectively seal the plurality of suction chambers.

6. The film-applying mechanism of claim 5, wherein each sealing portion defines a though hole cutting through the base body, the through hole communicates with the corresponding suction chamber for supplying air to and exhausting air from the suction chamber, the rotating joint defines a first air conduit communicating with the plurality of air conduits, the plurality of air conduits communicate with the plurality of though holes of the shielding cover, respectively.

7. The film-applying mechanism of claim 6, wherein a diameter of the rotating joint is equal to that of the shielding cover, and the plurality of air conduits respectively connects with the plurality of though holes directly.

8. The film-applying mechanism of claim 5, wherein the main body comprises a plurality of separating portions, each separating portion is formed between two adjacent suction chambers to separate the two adjacent suction chambers, each separating portion defines a fixing hole therein along an axial direction of the main body, the base body defines a plurality of mounting holes thereon, and each mounting hole is located between two adjacent sealing portions, the base body is fixed to the main body via the plurality of mounting holes and the plurality of fixing holes.

9. The film-applying mechanism of claim 4, wherein the bracket further comprises a mounting plate, and a pair of supporting plates, the pair of supporting plates extends from opposite ends of the mounting plate, the rotating shaft is rotatably mounted on the pair of supporting plates, opposite ends of the rotating shaft are connected to the pair of supporting plates, respectively, the main body and the rotating joint are rotatably sleeved on the rotating shaft.

10. The film-applying mechanism of claim 9, further comprising a mounting subassembly, wherein the main body defines a pair of receiving holes at opposite ends thereof and a sleeving hole interconnecting the pair of receiving holes, the sleeving hole is located between the pair of receiving holes and communicates with the pair of receiving holes at opposite ends of the receiving holes, the main body is rotatably sleeved on the rotating shaft via the sleeving hole, the mounting subassembly comprises a pair of bearings and a fixing member, the pair of bearings is respectively received in the pair of receiving holes and rotatably interconnects the rotating shaft and the main body, the fixing member is fittingly sleeved on the rotating shaft and resists one bearing toward the sleeving hole to hold the suction member.

11. The film-applying mechanism of claim 10, further comprising an adjusting assembly, wherein the adjusting assembly comprises a first friction member, a second friction member, and a pair of resisting members, the first friction member and the second friction member are located between the main body and one supporting plate, the second friction member is partially received in the first friction member and resists the main body toward the fixing member, the pair of resisting members extends through the first friction member, and resist against the second friction member toward the main body.

12. The film-applying mechanism of claim 11, wherein the resisting member comprises a head portion and a resisting portion coaxial to the head portion, the head portion exposes out of the supporting plate, and the resisting portion resists the second friction member toward the main body.

13. A vacuum-powered film-applying mechanism for adhering a flexible film to a workpiece, comprising:
a bracket comprising a mounting plate, a pair of supporting plates, and a rotating shaft, wherein the pair of supporting plates extends from opposite ends of the mounting plate, the rotating shaft is rotatably mounted on the pair of supporting plates, opposite ends of the rotating shaft are connected to the pair of supporting plates, respectively;
a suction member comprising a main body configured in an annular shape and a shielding cover mounted on an end of the main body, the main body rotatably sleeved on the rotating shaft, and defining a peripheral suction surface along a periphery thereof and a plurality of suction chambers therein for generating a negative pressure or a positive pressure on the peripheral suction surface, the suction chambers uniformly arranged adjacent to a periphery of the main body in a looped configuration, the shielding cover sealing the suction chambers; and
a rotating joint rotatably sleeved on the rotating shaft and defining a plurality of air conduits therein respectively communicating with the plurality of suction chambers, wherein when the suction member is rotated to suck the flexible film, the rotating joint is capable of exhausting air from the plurality of suction chambers one by one to enable the suction member to adhere and roll the flexible film thereon, when the suction member is rotated to adhere the flexible film to the workpiece, the rotating joint is capable of supplying air to the plurality of suction chambers one by one to enable the suction member to unroll and release the flexible film.

14. The film-applying mechanism of claim 13, wherein the peripheral suction surface defines a plurality of suction holes respectively communicating with the plurality of suction chambers, the plurality of suction holes are divided into several groups respectively communicate with the plurality of suction chamber.

15. The film-applying mechanism of claim 13, wherein the peripheral suction surface defines a plurality of suction holes respectively communicating with the plurality of suction chambers, the suction member is in a cylindrical shape, and the plurality of suction holes are uniformly distributed along the peripheral suction surface of the suction member.

16. The film-applying mechanism of claim 13, wherein the shielding cover comprises a base body configured in an annular shape and a plurality of sealing portions formed on the base body, the plurality of sealing portions are uniformly arranged adjacent to a periphery of the base body in a looped configuration for respectively seal the plurality of suction chambers.

17. The film-applying mechanism of claim 16, wherein each sealing portion defines a though hole cutting through the base body, the through hole communicates with the corresponding suction chamber for supplying air to and exhausting air from the suction chamber, the rotating joint further defines a first air conduit communicating with the plurality of air conduits, the plurality of air conduits communicate with the plurality of suction chambers via the plurality of though holes of the shielding cover.

18. The film-applying mechanism of claim 17, wherein a diameter of the rotating joint is equal to that of the shielding cover, and the plurality of air conduits respectively connects with the plurality of though holes directly.

19. The film-applying mechanism of claim 16, wherein the main body comprises a plurality of separating portions, each separating portion is formed between two adjacent suction chambers to separate the two adjacent suction chambers, each separating portion defines a fixing hole therein along an axial direction of the main body, the base body defines a plurality of mounting holes thereon, and each mounting hole is located between two adjacent sealing portions, the base body is fixed to the main body via the plurality of mounting holes and the plurality of fixing holes.

* * * * *